United States Patent
Hsiu

(10) Patent No.: US 8,259,438 B2
(45) Date of Patent: Sep. 4, 2012

(54) BUTTON LOCKING MECHANISM FOR PREVENTING A BUTTON FROM BEING PRESSED DOWN AND ELECTRONIC DEVICE THEREOF

(75) Inventor: Cheng-Min Hsiu, Taipei Hsien (TW)

(73) Assignee: Wistron Corporation, Xizhi Dist., New Taipei (TW)

(*) Notice: Subject to any disclaimer, the term of this patent is extended or adjusted under 35 U.S.C. 154(b) by 194 days.

(21) Appl. No.: 12/748,441

(22) Filed: Mar. 28, 2010

(65) Prior Publication Data
US 2011/0038107 A1 Feb. 17, 2011

(30) Foreign Application Priority Data
Aug. 13, 2009 (TW) .............................. 98214913 U

(51) Int. Cl.
*H05K 5/00* (2006.01)
*H05K 7/00* (2006.01)
*A47B 81/00* (2006.01)

(52) U.S. Cl. ......... 361/679.01; 361/679.02; 361/679.43; 361/679.44; 361/679.57; 312/223.1; 312/223.2

(58) Field of Classification Search .. 74/473.24–473.26, 74/483 R, 822; 70/131–142; 361/679.01–679.07, 361/679.4–679.45, 679.57–679.59, 679.41–679.44, 361/726–727, 732, 740–747, 759
See application file for complete search history.

(56) References Cited

U.S. PATENT DOCUMENTS

| 2,318,554 | A | * | 5/1943 | Raney ....................... 74/483 PB |
| 4,521,821 | A | * | 6/1985 | Kobayashi et al. ........... 360/137 |
| 2005/0225933 | A1 | * | 10/2005 | Kang et al. ................... 361/679 |

* cited by examiner

*Primary Examiner* — Jayprakash N Gandhi
*Assistant Examiner* — Jerry Wu
(74) *Attorney, Agent, or Firm* — Winston Hsu; Scott Margo

(57) ABSTRACT

A button locking mechanism includes a latch for being pushed in a first direction by a driving component, and a blocking component connected to the latch. A first incline structure is formed on the blocking component for contacting against a button when the blocking component moves in the first direction so that the blocking component moves in a second direction substantially perpendicular to the first direction. The button locking mechanism further includes a first elastic component connected to the blocking component for pushing the blocking component to move in a third direction opposite to the second direction so as to prevent the button from being pressed down.

18 Claims, 6 Drawing Sheets

BUTTON LOCKING MECHANISM FOR PREVENTING A BUTTON FROM BEING PRESSED DOWN AND ELECTRONIC DEVICE THEREOF

BACKGROUND OF THE INVENTION

1. Field of the Invention

The present invention relates to a button locking mechanism, and more particularly, to a button locking mechanism for preventing a button from being pressed down.

2. Description of the Prior Art

A plurality of buttons is often disposed on a conventional electronic product. A user operates the plurality of buttons for executing functions of the electronic product. However, when the user presses the wrong button, the electronic product executes the wrong function. For example, when the user presses a power button accidentally, the electronic product is rebooted so that software of the electronic product is damaged easily. The power button of the electronic product put on a market in particular, such as the power button of a notebook computer, is easily pressed intentionally or accidentally, resulting in inconvenient management. Thus, design of a button locking mechanism capable of operating easily is an important issue in the electronic product industry.

SUMMARY OF THE INVENTION

The present invention provides a button locking mechanism for preventing a button from being pressed down for solving above drawbacks.

According to the claimed invention, button locking mechanism includes a latch for being pushed in a first direction by a driving component, a blocking component connected to the latch, a first inclined structure being formed on the blocking component for contacting against a button when the blocking component moves in the first direction so that the blocking component moves in a second direction substantially perpendicular to the first direction, and a first elastic component connected to the blocking component for pushing the blocking component to move in a third direction opposite to the second direction so as to prevent the button from being pressed down.

According to the claimed invention, an electronic device includes a housing whereon an opening is formed, a switch installed inside the housing, a button installed on the housing for triggering the switch, and a button locking mechanism installed inside the housing for preventing the button from being pressed down. The button locking mechanism includes a latch for being pushed in a first direction by a driving component when the driving component passes through the opening on the housing, a blocking component connected to the latch, a first inclined structure being formed on the blocking component for contacting against the button when the blocking component moves in the first direction so that the blocking component moves in a second direction substantially perpendicular to the first direction, and a first elastic component connected to the blocking component for pushing the blocking component to move in a third direction opposite to the second direction so as to prevent the button from being pressed down and to prevent the button from triggering the switch.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
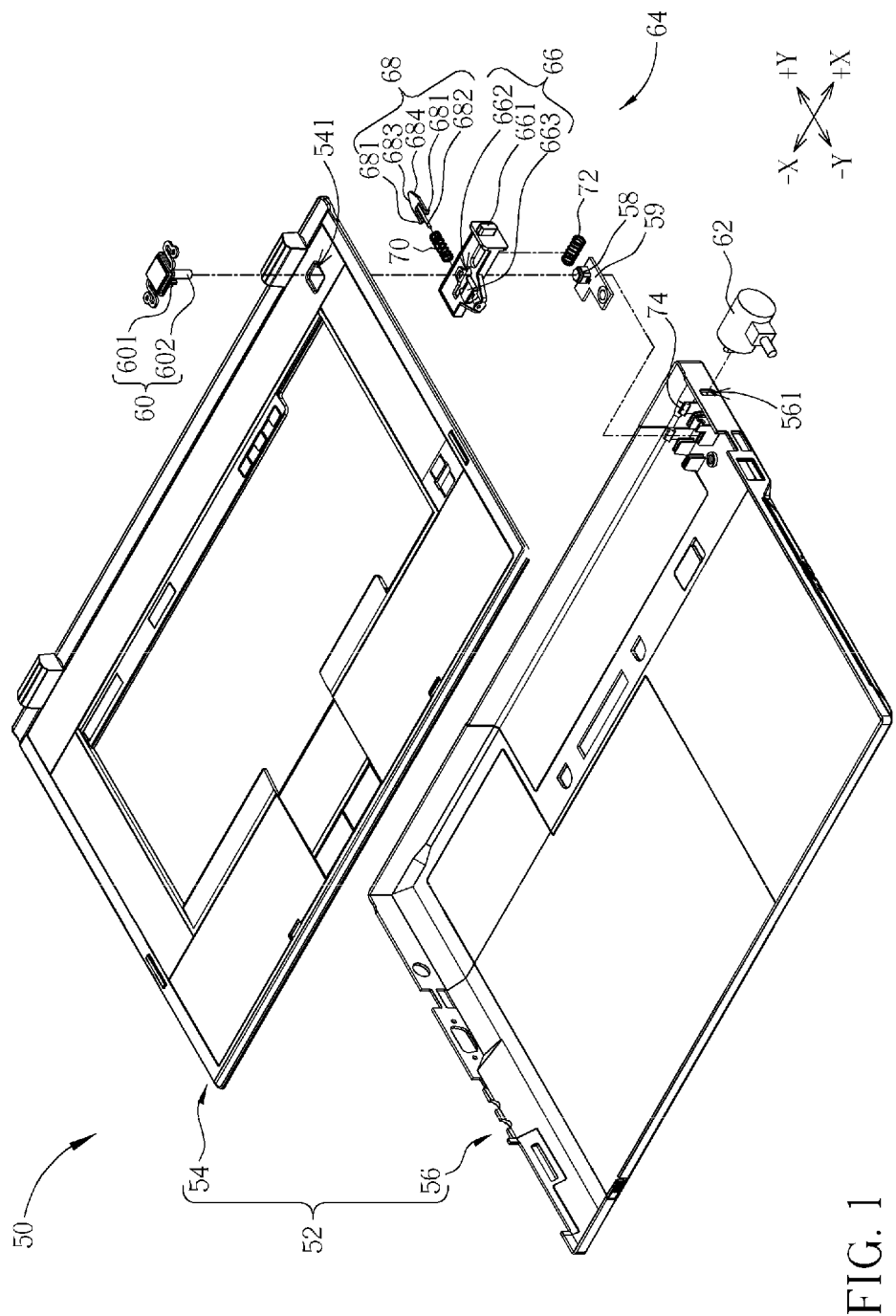
FIG. 1 is an exploded diagram of an electronic device according to a preferred embodiment of the present invention.

Please refer to FIG. 1. FIG. 1 is an exploded diagram of an electronic device 50 according to a preferred embodiment of the present invention. The electronic device 50 can be a portable electronic device, such as a notebook computer. The electronic device 50 includes a housing 52 for covering internal components. The housing 52 includes an upper covering 54 and a lower covering 56. An opening 541 and an opening 561 are formed on the upper covering 54 and the lower covering 56, respectively. The electronic device 50 further includes a switch 58 installed inside the housing 52, and a circuit board 59 for holding the switch 58. The switch 58 can be a power switch. The electronic device 50 further includes a button 60 installed inside the opening 541 on the upper covering 54 for triggering the switch 58. The button 60 includes a main body 601 and a stick 602 connected to the main body 601. A user can press down the main body 601 so as to drive the stick 602 to move downward to trigger the switch 58. In addition, a driving component 62 passes through the opening 561 on the lower covering 56. The driving component 62 can be a computer lock for locking the electronic device 50 on another object.

The electronic device 50 further includes a button locking mechanism 64 installed inside the housing 52 for preventing the button 60 from being pressed down. The button locking mechanism 64 includes a latch 66 for being pushed in a first direction (−X direction) by the driving component 62 when the driving component 62 passes through the opening 561 on the lower covering 56. The latch 66 includes a protruding part 661 for contacting with the driving component 62. A hole 662 is formed on the latch 66, and the stick 602 of the button 60 passes through the hole 662. In addition, the latch 66 further includes a covering 663. The button locking mechanism 64 further includes a blocking component 68 passing through the covering 663. The blocking component 68 includes at least one hook 681 for engaging with the covering 663 so that the blocking component 68 is engaged with the latch 66. In this embodiment, the blocking component 68 includes two hooks 681. The blocking component 68 further includes a sliding rod 682 passing through the latch 66 in a slidable manner. In addition, a first inclined structure 683 and a second inclined structure 684 are formed on the blocking component 68. The button locking mechanism 64 further includes a first elastic component 70 sheathing the sliding rod 682 of the blocking component 68. The first elastic component 70 can be a spring. The button locking mechanism 64 further includes a second elastic component 72 connected to the latch 66. The second elastic component 72 can be a spring. In addition, a supporting structure 74 is disposed on an inner side of the lower covering 56 for supporting the button locking mechanism 64. The supporting structure 74 can be a rib structure protruding from the lower covering 56. The supporting structure 74 can be integrated with the lower covering 56 monolithically.

Figure 2:
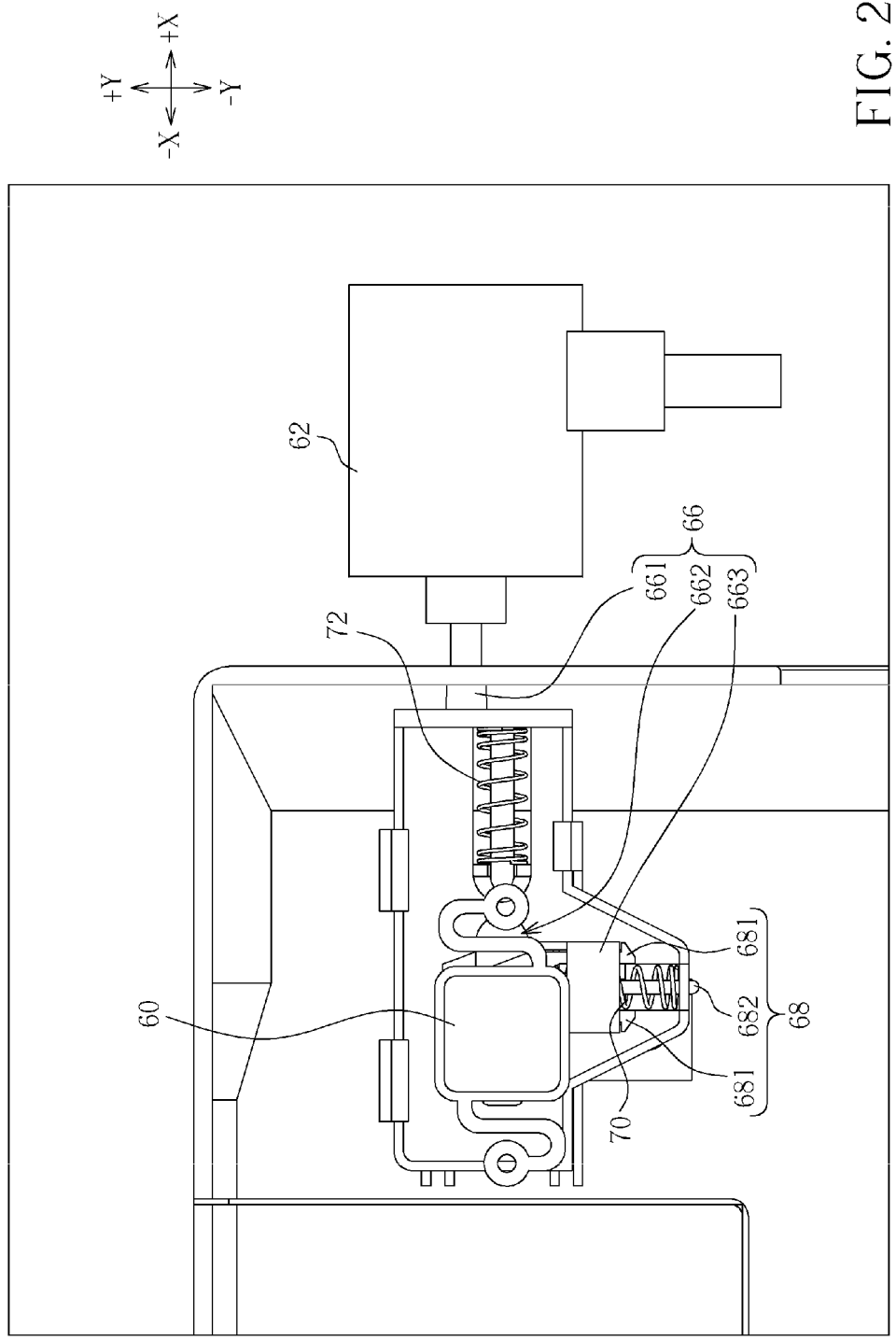
FIG. 2 and FIG. 3 are a top view and a schematic drawing of a button locking mechanism unlocking a button according to the preferred embodiment of the present invention, respectively.
Figure 3:
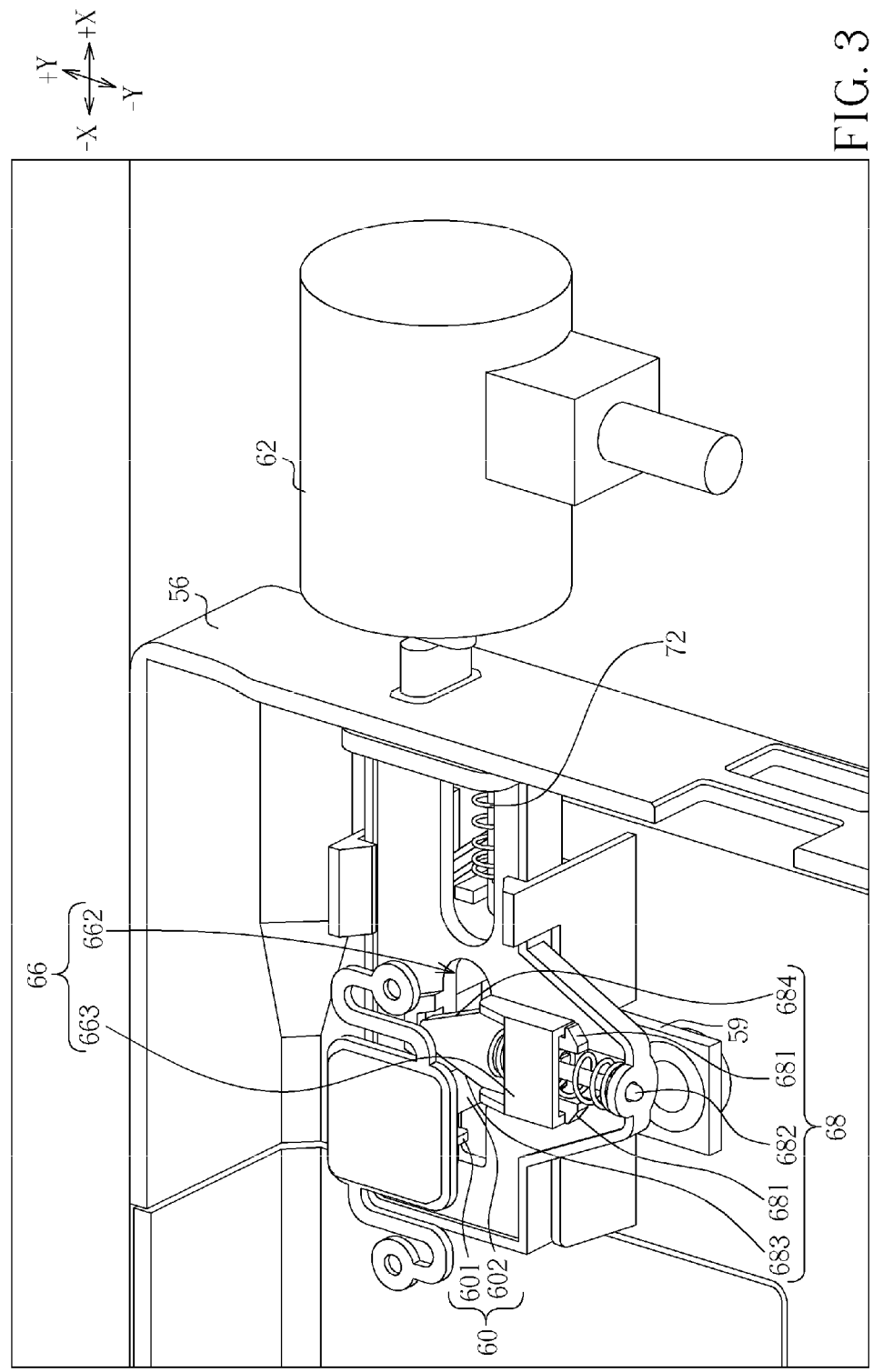
Figure 4:
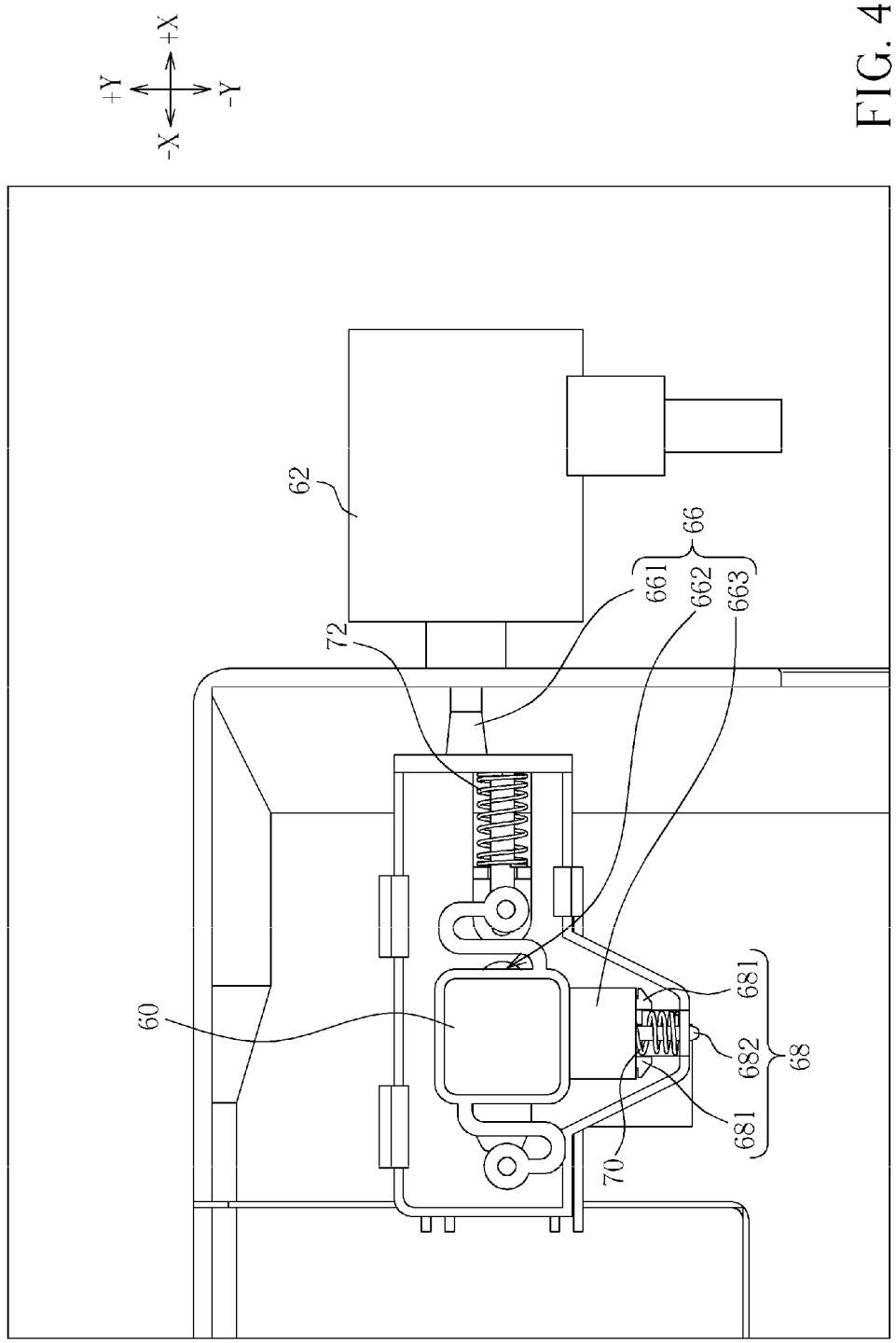
FIG. 4, FIG. 5, and FIG. 6 are a top view and schematic drawings in different views of the button locking mechanism locking the button according to the preferred embodiment of the present invention, respectively.
Figure 5:
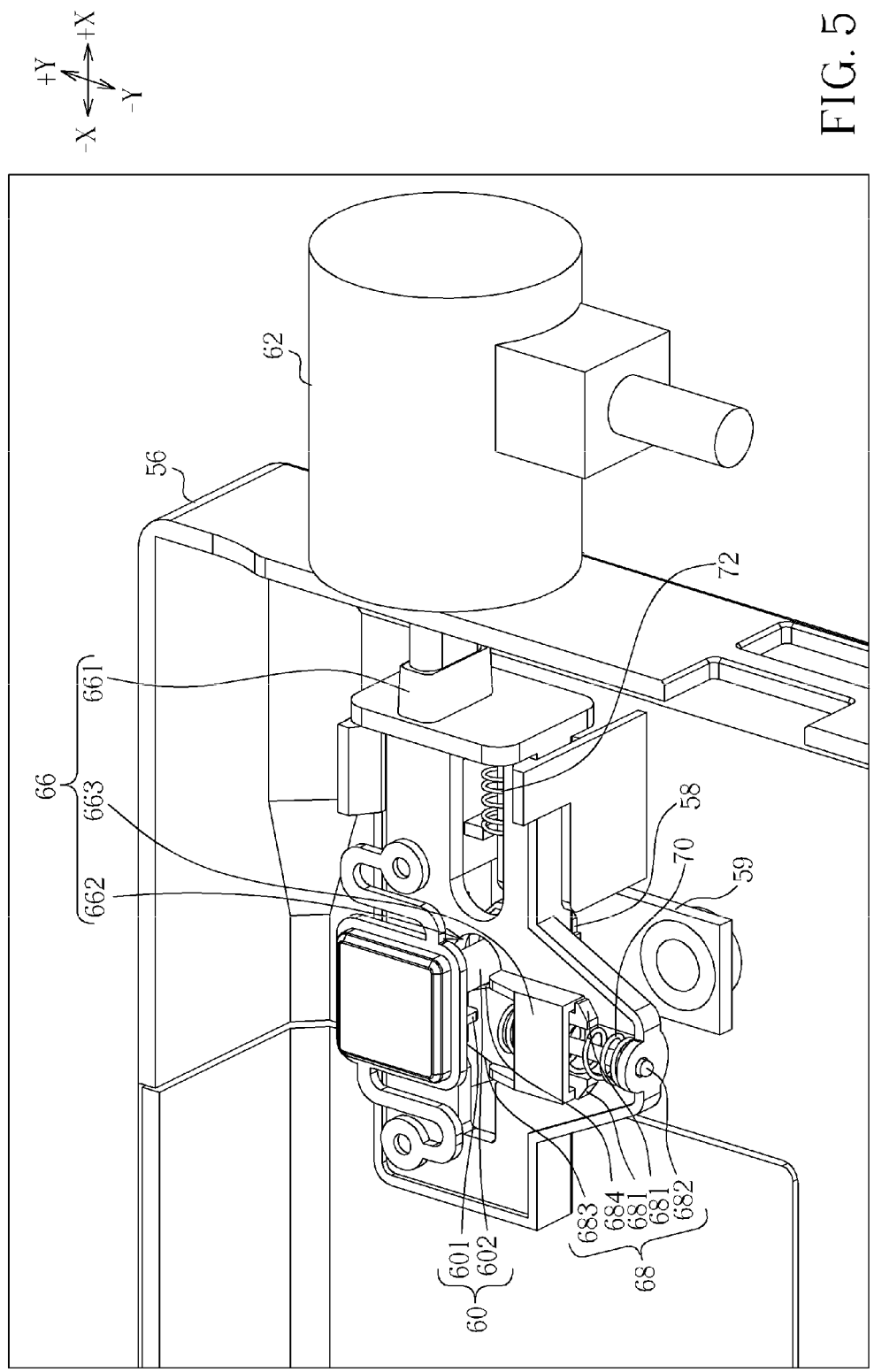
Figure 6:
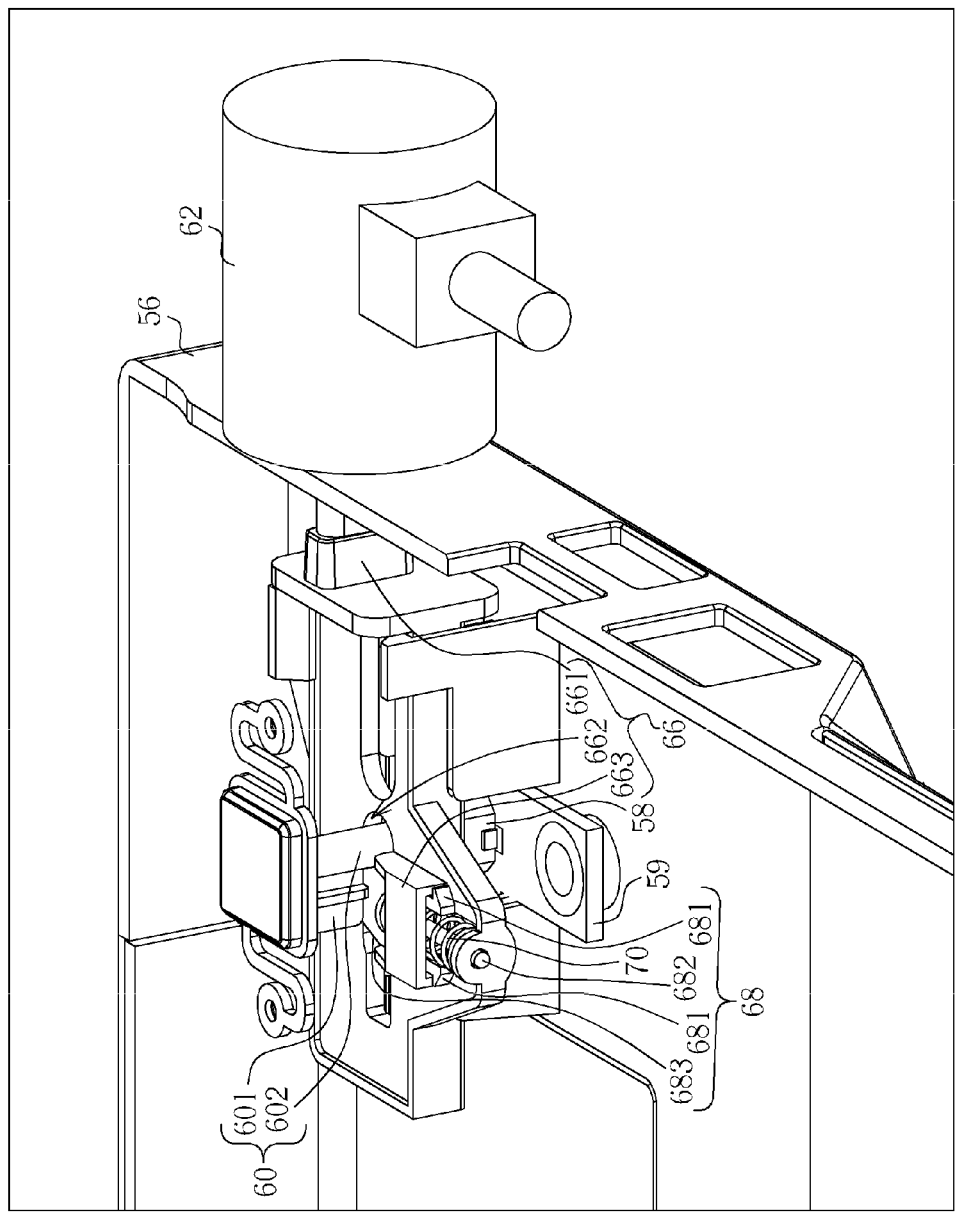

Please refer to FIG. 2 and FIG. 3. FIG. 2 and FIG. 3 are a top view and a schematic drawing of the button locking mechanism 64 unlocking the button 60 according to the preferred embodiment of the present invention, respectively. When the driving component 62 has not been inserted into the opening 561 on the lower covering 56, the latch 66 and the blocking component 68 are close to the opening 561 on the lower covering 56, and the blocking component 68 can not prevent the button 60 from being pressed down. That is to say, the user can press the button 60 down so as to trigger the switch 58. Please refer to FIG. 2 to FIG. 6. FIG. 4, FIG. 5, and FIG. 6 are a top view and schematic drawings in different views of the button locking mechanism 64 locking the button 60 according to the preferred embodiment of the present invention, respectively. When the driving component 62 has been inserted into the opening 561 on the lower covering 56, the driving component 62 pushes the protruding part 661 of the latch 66 to move in the first direction (−X direction). Meanwhile, the blocking component 68 installed on the latch 66 is moved in the first direction (−X direction) and is removed from the opening 561 on the lower covering 56. Then, the first inclined structure 683 of the blocking component 68 contacts against the stick 602 of the button 60. Due to sliding movement of the first inclined structure 683 relative to the stick 602 of the button 60, the blocking component 68 can move in a second direction (−Y direction) substantially perpendicular to the first direction (−X direction) and the first elastic component 70 and the second elastic component 72 are compressed at this time. After the driving component 62 pushes the protruding part 661 of the latch 66 to move in a predetermined distance in the first direction (−X direction), the first inclined structure 683 of the blocking component 68 departs from the stick 602 of the button 60. Therefore, the first elastic component 70 is not compressed and can provide an elastic recovering force to the blocking component 68 so as to push the blocking component 68 to move in a third direction (+Y direction) opposite to the second direction (−Y direction), as shown in FIG. 4 to FIG. 6, so that the blocking component 68 blocks the main body 601 of the button 60 and prevents the button 60 from being pressed down. Thus, the stick 602 of the button 60 can not trigger the switch 58 so that the button 60 is locked.

On the contrary, when the user intends to release the button 60 from the button locking mechanism 64, the user can pull the driving component 62 out of the opening 561 on the lower covering 56. Because the driving component 62 does not apply force on the latch 66 at this time, the second elastic component 72 is not compressed and can provide an elastic recovering force to the latch 66 so as to drive the latch 66 to move in a fourth direction (+X direction) opposite to the first direction. Meanwhile, the second inclined structure 684 of the blocking component 68 contacts against the stick 602 of the button 60. Due to sliding movement of the second inclined structure 684 relative to the stick 602 of the button 60, the blocking component 68 can move in the second direction (−Y direction) again, and the first elastic component 70 is compressed again. When the latch 66 moves to a position where the second inclined structure 684 departs from the stick 602 of the button 60, the first elastic component 70 is not compressed and can provide an elastic recovering force to the blocking component 68, so as to push the blocking component 68 to move in the third direction (+Y direction) back to a position shown in FIG. 2 and FIG. 3. Thus, the blocking component 68 does not block the main body 601 of the button 60, and stick 602 of the button 60 can trigger the switch 58, so that the button 60 is unlocked.

Comparing to the prior art, when the driving component, such as the computer lock, is inserted into the housing, the button locking mechanism of the present invention can lock the button simultaneously, which means the button locking mechanism prevents the button from being pressed down. Therefore, the button locking mechanism of the present invention can prevent the power button from being pressed intentionally or accidentally so as to avoid damage of software by rebooting. When the computer lock locks the electronic device on an object, such as a notebook computer put on a market, the button locking mechanism of the present invention can lock the power button simultaneously so as to improve convenience and security.

Those skilled in the art will readily observe that numerous modifications and alterations of the device and method may be made while retaining the teachings of the invention.

What is claimed is:

1. A button locking mechanism comprising:
   a latch for being pushed in a first direction by a driving component;
   a blocking component connected to the latch, a first inclined structure being formed on the blocking component for contacting against a button when the blocking component moves in the first direction from a first position, and then the first inclined structure sliding relative to the button so that the blocking component moves in a second direction substantially perpendicular to the first direction when the blocking component is in a second position; and
   a first elastic component connected to the blocking component for pushing the blocking component to move in a third direction opposite to the second direction so as to prevent the button from being pressed down when the blocking component is in a second position.

2. The button locking mechanism of claim 1, wherein the latch comprises a protruding part for contacting with the driving component.

3. The button locking mechanism of claim 1, wherein a hole is formed on the latch and the button passes through the hole.

4. The button locking mechanism of claim 1, wherein the latch comprises a covering and the blocking component passes through the covering.

5. The button locking mechanism of claim 4, wherein the blocking component comprises at least one hook for engaging with the covering.

6. The button locking mechanism of claim 1, wherein the blocking component comprises a sliding rod passing through the latch in a slidable manner and the first elastic component sheathes the sliding rod.

7. The button locking mechanism of claim 1 further comprising:
   a second elastic component connected to the latch for pushing the latch to move in a fourth direction opposite to the first direction when the latch is not pushed by the driving component.

8. The button locking mechanism of claim 7, wherein a second inclined structure is formed on the blocking component for contacting against the button when the second elastic component pushes the latch to move in the fourth direction so that the blocking component moves in the second direction.

9. An electronic device comprising:
a housing whereon an opening is formed;
a switch installed inside the housing; a button installed on the housing for triggering the switch; and
a button locking mechanism installed inside the housing for preventing the button from being pressed down, the button locking mechanism comprising:
a latch for being pushed in a first direction by a driving component when the driving component passes through the opening on the housing;
a blocking component connected to the latch, a first inclined structure being formed on the blocking component for contacting against the button when the blocking component moves in the first direction from a first position, and then the first inclined structure sliding relative to the button so that the blocking component moves in a second direction substantially perpendicular to the first direction when the blocking component is in a second position; and
a first elastic component connected to the blocking component for pushing the blocking component to move in a third direction opposite to the second direction so as to prevent the button from being pressed down and to prevent the button from triggering the switch when the blocking component is in a second position.

10. The electronic device of claim 9, wherein the latch comprises a protruding part for contacting with the driving component.

11. The electronic device of claim 9, wherein a hole is formed on the latch, the button comprises a main body and a stick connected to the main body and passing through the hole, the stick is for triggering the switch, and the blocking component is for preventing the main body from being pressed down so that the stick can not trigger the switch.

12. The electronic device of claim 9, wherein the latch comprises a covering and the blocking component passes through the covering.

13. The electronic device of claim 12, wherein the blocking component comprises at least one hook for engaging with the covering.

14. The electronic device of claim 9, wherein the blocking component comprises a sliding rod passing through the latch in a slidable manner and the first elastic component sheathes the sliding rod.

15. The electronic device of claim 9 further comprising:
a second elastic component connected to the latch for pushing the latch to move in a fourth direction opposite to the first direction when the latch is not pushed by the driving component.

16. The electronic device of claim 15, wherein a second inclined structure is formed on the blocking component for contacting against the button when the second elastic component pushes the latch to move in the fourth direction so that the blocking component moves in the second direction.

17. The electronic device of claim 9, wherein a supporting structure is disposed inside the housing for supporting the button locking mechanism.

18. The electronic device of claim 9, wherein the driving component is a computer lock.

\* \* \* \* \*